No. 871,682. PATENTED NOV. 19, 1907.
J. P. FISHBURN.
LAWN SPRINKLING DEVICE.
APPLICATION FILED OCT. 15, 1906.
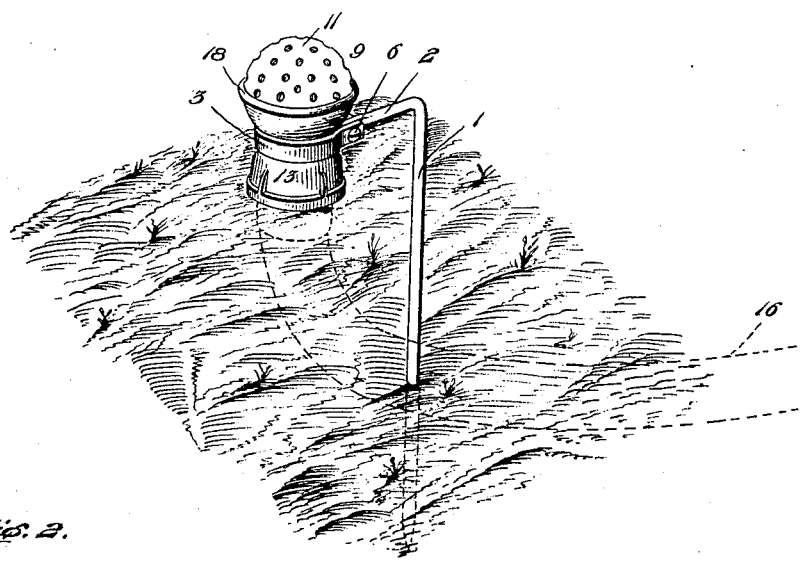
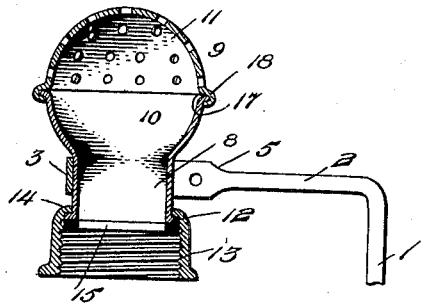
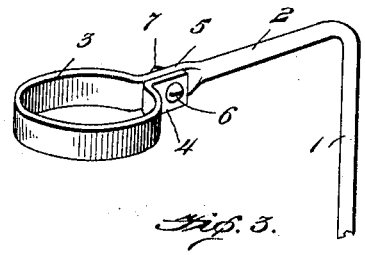
Witnesses
Inventor
John P. Fishburn
By
E. E. Vrooman,
his Attorney

UNITED STATES PATENT OFFICE.

JOHN P. FISHBURN, OF LOS ANGELES, CALIFORNIA.

LAWN-SPRINKLING DEVICE.

No. 871,682.　　　Specification of Letters Patent.　　　Patented Nov. 19, 1907.

Application filed October 15, 1906. Serial No. 338,988.

*To all whom it may concern:*

Be it known that I, JOHN P. FISHBURN, a citizen of the United States, residing at Los Angeles, in the county of Los Angeles and State of California, have invented certain new and useful Improvements in Lawn-Sprinkling Devices, of which the following is a specification, reference being had therein to the accompanying drawing.

This invention relates to improvements in lawn sprinkling devices, and has for its object the provision of means for facilitating the sprinkling or watering of lawns and gardens.

Another object of the invention is the improvement of the construction of a device formed of a minimum number of parts, which device is comparatively inexpensive to construct.

With these and other objects in view, the invention consists of certain other novel constructions, combinations, and arrangements of parts, as will be hereinafter fully described and claimed.

In the drawings: Figure 1 is a perspective view of a device constructed in accordance with the present invention. Fig. 2 is a vertical, sectional view of the sprinkler-head and a fragmentary view of the support. Fig. 3 is a fragmentary, perspective view of the upper portion of the support.

Referring to the drawings by numerals, 1 designates the vertical portion of a rod-like support, which is bent intermediate its ends and produces a horizontal, preferably right-angled, integral extension 2. The extension 2 terminates at its outer end in an integral, annular, expansible spring-collar 3, which collar is provided at its outer free end with an integral, flat lug 4. The lug 4 is positioned normally parallel with a flattened portion 5 of the extension 2 of the support. The flat portion 5 and the lug 4 are apertured for receiving a threaded bolt 6, which bolt 6 is provided with a nut 7, Fig. 3. The bolt and nut 6 and 7, respectively, constitute fastening means whereby the collar may be securely clamped around the neck 8 of the sprinkler-head 9. The sprinkler-head 9 comprises a lower section 10 and an upper section 11. The neck 8 of the lower section is preferably annular shape and is outwardly flared at its lower end, thereby producing an outwardly-extending, annular flange 12. A coupling-collar 13 is supported upon the neck 8 between flange 12 and collar 3. The integral, inwardly-extending flange 14 of the coupling-collar 13 engages the neck 8 and normally rests upon flange 12. The collar 13 is internally threaded for receiving an ordinary coupling device secured to the end of a hose. A flexible washer 15 is positioned within the threaded collar 13, and is employed for the ordinary purpose of obtaining a tight joint, when the hose, as indicated by dotted lines 16, Fig. 1, is coupled to said collar. The coupling-collar is capable of a slight longitudinal movement upon the neck 8 between collar 3 and flange 12 for facilitating the attachment of the hose 16 to the sprinkler-head 9; said collar 3 limits the longitudinal movement of the coupling-collar 13 upon said neck 8 for preventing displacement of the washer 15. The upper edge of the section 10 is provided with an annular flange or rim 17.

The upper section 11 is perforated or apertured and is provided with an annular bead 18. When the upper and lower sections are secured together, the bead 18 fits over the annular flange or rim 17, thereby fixedly securing the sections together. The securing of the sections together is ordinarily done by machinery during the manufacture of the sprinkler-head. By forming the sprinkler-head in sections, the punching of the apertures in the upper section is easily accomplished, without extra labor or ruining the shape of the upper section, as would be the case if the punching of the apertures was attempted in a single-piece head. It is to be noted that I preferably form my head of sheet-metal, as for instance, brass. Many advantages are obtained by forming the head of sheet-metal, among which may be mentioned the lightness in weight and the ease with which the parts are manufactured and assembled.

The sprinkler-head is carried by the support by placing the clamping-collar 3 around the neck 8, and subsequently bringing the lug 4 in engagement with the flattened portion 5 and securing said lug in this position by any suitable fastening means, as for instance, bolt and nut 6 and 7, respectively. The device is then ready for use, and the operator can secure the same in any desired position by forcing the vertical portion of the support into the ground. The hose 16 may be attached either before or after the device has been positioned.

What I claim is:

1. In a device of the character described, the combination of a sprinkler-head support, comprising a vertical portion bent intermediate its ends and provided with an integral, horizontal extension, a spring-collar provided at one end with a flattened portion, said flattened portion integral with the horizontal extension and the opposite end of said spring-collar left free, a sheet-metal sprinkler head provided with a depending neck terminating at its lower end in an outwardly flared portion, producing an integral, horizontal, annular flange, the neck positioned within the spring-collar, means clamping the spring-collar upon said neck, said spring-collar of less width than the length of said neck, a coupling-collar provided with an inwardly-extending, annular flange, positioned upon said neck between the spring-collar and the outwardly-extending, horizontal flange of the neck, the inwardly-extending flange of the coupling-collar engaging the neck and normally resting upon the outwardly-extending flange of the neck, said coupling-collar being capable of a slight longitudinal movement upon said neck between the spring-collar and the horizontal annular flange of the neck, and a washer in said coupling-collar, said spring-collar limiting the longitudinal movement of the coupling collar upon said neck for preventing displacement of the washer.

2. In a device of the character described, the combination with a sprinkler-head support, provided with a collar, of a sprinkler-head provided with a depending neck terminating at its lower end in an integral, outwardly-extending, annular flange, the neck positioned within said collar, said collar of less width than the length of said neck, a coupling-collar provided with an inwardly-extending, annular flange, positioned upon said neck between said first-mentioned collar and the outwardly-extending horizontal flange of the neck, the inwardly-extending flange of the coupling-collar engaging and normally resting upon the outwardly-extending flange of said neck, said coupling-collar being capable of a slight longitudinal movement upon said neck between said first-mentioned collar and the flange of the neck, and a washer in said coupling-collar, said first-mentioned collar limiting the longitudinal movement of the coupling-collar upon said neck for preventing displacement of the washer.

In testimony whereof I hereunto affix my signature in presence of two witnesses.

JOHN P. FISHBURN.

Witnesses:
T. F. SIMPSON,
C. R. THOMAS.